United States Patent
Li et al.

(10) Patent No.: US 11,939,517 B2
(45) Date of Patent: Mar. 26, 2024

(54) POROUS POLYURETHANE FOR CONSOLIDATION OF MATERIAL IN SUBTERRANEAN FORMATIONS

(71) Applicant: Saudi Arabian Oil Company, Dhahran (SA)

(72) Inventors: Wenwen Li, Pearland, TX (US); Fakuen Frank Chang, Houston, TX (US); Feng Liang, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/715,495

(22) Filed: Apr. 7, 2022

(65) Prior Publication Data

US 2022/0348814 A1 Nov. 3, 2022

Related U.S. Application Data

(60) Provisional application No. 63/180,978, filed on Apr. 28, 2021.

(51) Int. Cl.
| | | |
|---|---|---|
| *C09K 8/28* | (2006.01) | |
| *C09K 23/00* | (2022.01) | |
| *C09K 23/18* | (2022.01) | |
| *C09K 23/36* | (2022.01) | |
| *C09K 23/38* | (2022.01) | |

(52) U.S. Cl.
CPC .............. *C09K 8/28* (2013.01); *C09K 23/018* (2022.01); *C09K 23/18* (2022.01); *C09K 23/36* (2022.01); *C09K 23/38* (2022.01)

(58) Field of Classification Search
CPC ........ C09K 8/28; C09K 23/018; C09K 23/18; C09K 23/36; C09K 23/38
See application file for complete search history.

(56) References Cited

U.S. PATENT DOCUMENTS

| | | |
|---|---|---|
| 5,287,207 A | 2/1994 | Mulkens et al. |
| 5,500,451 A | 3/1996 | Goldman et al. |
| 6,632,778 B1 | 10/2003 | Ayoub et al. |
| 8,551,924 B2 | 10/2013 | Rickman et al. |
| 8,555,973 B2 | 10/2013 | Welton et al. |
| 8,708,044 B2 | 4/2014 | Aston et al. |
| 2015/0114646 A1* | 4/2015 | Price Hoelscher .... C09K 8/032 166/302 |

OTHER PUBLICATIONS

David (David G. et al., Porous Polyurethane synthesized with high internal phase emulsion, Journal of Polymer Science Part A: Polymer Chemistry, 2009, 475806-5814).*
Alakbari et al., "Chemical Sand Consolidation: From Polymers to Nanoparticles," Polymers 2020, 12, 1069, May 2020, 30 pages.
Mishra et al., "Chemical sand consolidation: an overview." J. Pet. Eng. Technol. 5, 2015, 21-34, 14 pages.
Zhang et al., "Hydrophobic polyurethane polyHIPEs templated from mannitol within nonaqueous high internal phase emulsions for oil spill recovery." Journal of Polymer Science Part A: Polymer Chemistry 57.12, Jun. 2019, 1315-1321, 7 pages.
SAIP Examination Report in Saudi Arabian Appln. No. 122430999, dated Jun. 12, 2023, 17 pages (with English Translation).

* cited by examiner

*Primary Examiner* — Kumar R Bhushan
(74) *Attorney, Agent, or Firm* — Fish & Richardson P.C.

(57) ABSTRACT

A method and a system for consolidating a subterranean formation are provided. An exemplary method includes injecting a water-in-oil emulsion into an unconsolidated subterranean formation, wherein the water-in-oil emulsion includes comonomers in an oil phase to form a polyurethane resin, and a catalyst in an aqueous phase. The method also includes allowing the polyurethane resin to cure to form a porous polymeric network.

8 Claims, 3 Drawing Sheets

100

POROUS POLYURETHANE FOR CONSOLIDATION OF MATERIAL IN SUBTERRANEAN FORMATIONS

CROSS-REFERENCE TO RELATED APPLICATION

This application claims the benefit of priority to U.S. Provisional Patent Application No. 63/180,978, filed on Apr. 28, 2021, which is hereby incorporated by reference in its entirety.

TECHNICAL FIELD

The present disclosure is directed to lowering the migration and production of sand in wells. Specifically, the disclosure is directed to a polymer that consolidates loose material in a well.

BACKGROUND

Sand production is the migration of formation sand induced by the flow of reservoir fluids, which is associated with an unconsolidated or a partially consolidated formation. Excess sand production can cause a number of problems, including erosion of downhole and surface equipment, plugging of the well, reduction of well productivity, and an increase in production costs.

Sand control is important for the economical extraction of oil and gas from the unconsolidated or partially consolidated formations. There are many techniques that have been used in the petroleum industry to manage and control sand production. Typical examples include controlling production rates to limit sand entrainment. Other techniques include mechanical methods and chemical methods.

Mechanical methods generally include utilization of filter-type devices, such as sand screens. These devices are placed in the well opposite to the unconsolidated sand and may prevent movement of rock grains into the wellbore. Mechanical methods are successful in certain cases, but the filter materials often plug or erode. Extra cost is thus incurred for cleaning or replacement of the filter materials. In addition, mechanical methods also have problems with controlling fine particles. Further, the presence of the mechanical systems may interfere with the completions and workover operations.

Chemical methods are another approach that can be used to control sand production from the unconsolidated formation. Chemical methods generally involve the injection of reactive chemicals, such as liquid resins, into the unconsolidated rock surrounding the well. The resin can then be cured to form a consolidated rock mass. The cured resin will bond the partially consolidated or unconsolidated grains at their point of contact and strengthen the formation in the intermediate area of the wellbore. However, the bonding may be problematic for formation productivity, as the cured resins may seal a portion of the pore space and reduce formation permeability.

Various resins have been tested in the oil and gas industry to mitigate sand production by consolidation of formation sand. These resins include epoxy resins, furan (fufuryl alcohol) resins, phenolic resins, and silicate polymer. The resins are mixed with appropriate hardeners, catalysts, or other chemicals to form a cured polymer network in the well.

Each of the chemical resin systems have advantages and disadvantages. For example, cured epoxy resins show substantial mechanical strength, good heat and chemical resistance, versatile processability, and good adhesion strength. However, epoxy systems may reduce the permeability significantly (as high as 95%). Accordingly, they often require multistage process injection to prevent sealing the pore space.

Furan resins have good corrosion resistance to inorganic acids, excellent heat resistance, and provide high compressive strength. However, furan resins have poor oxidation resistance and a low flash point. Additionally, corrosive materials like sulfuric acid may be used in the consolidation procedure.

Phenolic resins have a high heat distortion temperature, high tensile strength and hardness, and good compressive strength. However, they are difficult to use. They may also reduce the formation permeability significantly.

The use of silicate polymer for sand consolidation provides a high retention of permeability. Further, the chemicals are less sensitive to formation fluid, which may reduce the negative impact on the formation productivity. However, the compression strength is low with silicate polymer consolidation, possible leading to fragmentation and deconsolidation. The heat resistance of the cured materials is not as good as other polymers.

SUMMARY

An embodiment described in examples herein provides a method for consolidating a subterranean formation. The method includes injecting a water-in-oil emulsion into an unconsolidated subterranean formation, wherein the water-in-oil emulsion includes comonomers in an oil phase to form a polyurethane resin, and a catalyst in an aqueous phase. The method also includes allowing the polyurethane resin to cure to form a porous polymeric network.

Another embodiment described in examples herein provides a composition for treating an unconsolidated subterranean formation, including a water-in-oil emulsion. The water-in-oil emulsion includes an oil phase including less than 50% by volume of the water-in-oil emulsion. The oil phase includes a polyol compound, a polyisocyanate compound, and an oil soluble emulsifier. The water-in-oil emulsion includes an aqueous phase including greater than 50% by volume of the water-in-oil emulsion. The aqueous phase includes water and a catalyst.

DETAILED DESCRIPTION

To successfully consolidate formation sand using a chemical approach, it is important to select a chemical material that can provide high compressive strength without causing a substantial reduction in permeability.

The present disclosure describes curable water-in-oil emulsion based resin treatment fluids for consolidating subterranean formations around wells. The water-in-oil emulsion based resin treatment fluid includes curable polyurethane resins and their use in consolidating formation sand. The curable polyurethane formulation will lead to formation of consolidated sand pack with high strength while maintaining maximum permeability after resin curing.

The polyurethane treatment fluid described herein is a water-in-oil emulsion having at least 50 volume percent of an internal aqueous phase and less than 50 volume percent of an external oil (organic) phase. The advantage of using water-in-oil emulsion based polyurethane treatment fluid verses other treatment fluids, is that curing the water-in-oil emulsion at elevated downhole temperatures forms a porous polyurethane with an interconnected pore structure. The formation of the porous structure is due to the presence of an internal aqueous phase in the water-in-oil emulsion and the generation of $CO_2$ gas through reaction of isocyanate with water. Thus, no additional blowing agents are needed. The formation of interconnected pore space reduces the problem of permeability reduction after typical chemical sand consolidation treatment. Meanwhile, the cured polyurethane resin would bond the sand grains together and strengthen the formation due to the formation of a crosslinked polymeric network.

Figure 1:
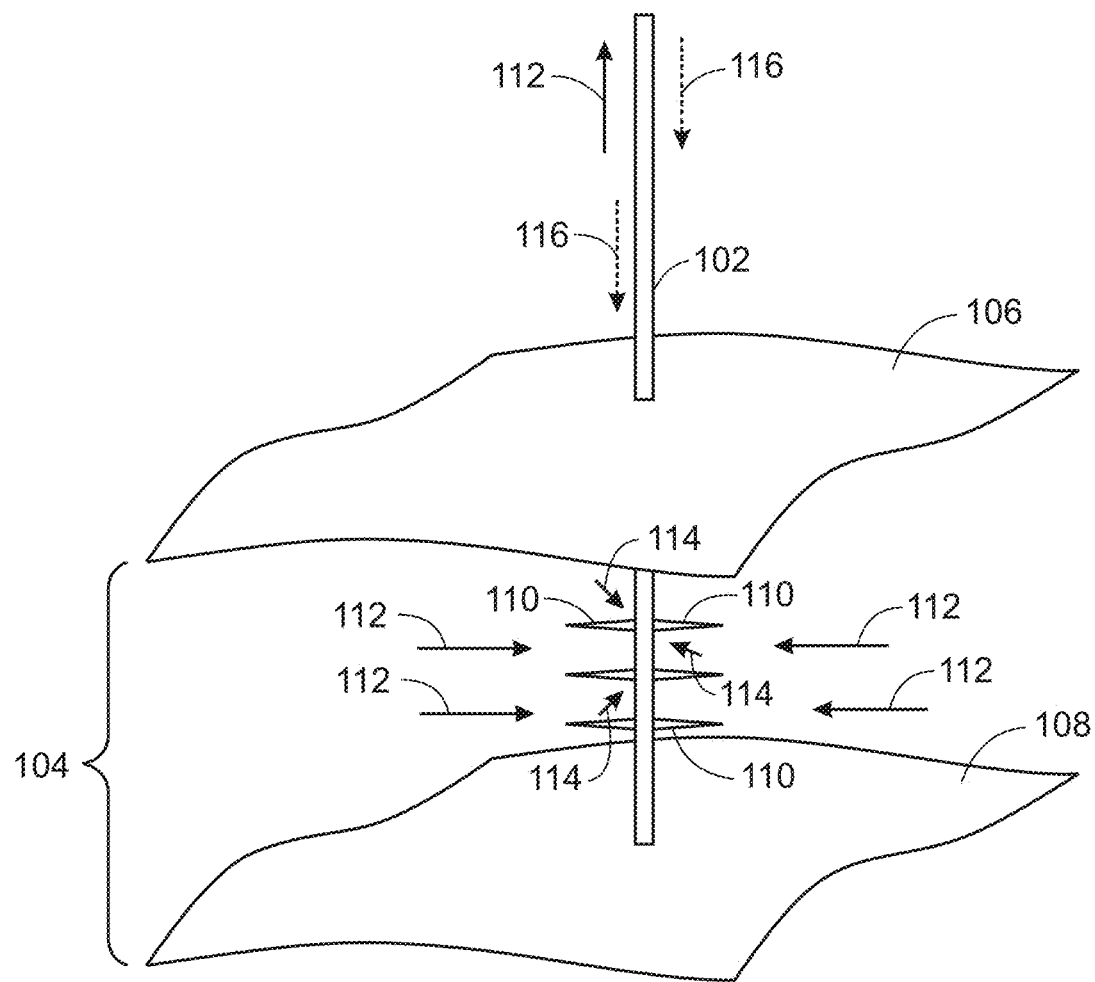
FIG. 1 is a schematic drawing of a wellbore, showing sand infiltration into the wellbore in an unconsolidated reservoir layer.

FIG. 1 is a schematic drawing 100 of a wellbore 102, showing sand infiltration into the wellbore 102 in an unconsolidated reservoir layer 104. In this illustration, the unconsolidated reservoir layer 104 is between a cap rock layer 106 and a lower layer 108, such as a water layer, or a layer separating deeper reservoir layers.

Perforations in the casing of the wellbore 102 may lead to regions 110 in the unconsolidated reservoir layer 104 for producing reservoir fluids 112. It may be understood that the regions 110 are not actual openings in the formation, but that reservoir fluids 112 flow through to reach the perforations. However, in unconsolidated formations, sand 114 may collapse the regions 110, plug the perforations, or be entrained in the produced fluids, potentially damaging or plugging downstream equipment.

In embodiments described herein, a water-in-oil emulsion 116 is provided to the unconsolidated formation. The water-in-oil emulsion 116 includes ingredients that creates a permeable polyurethane material in the sand 114 in vicinity of the regions 110.

Figure 2:
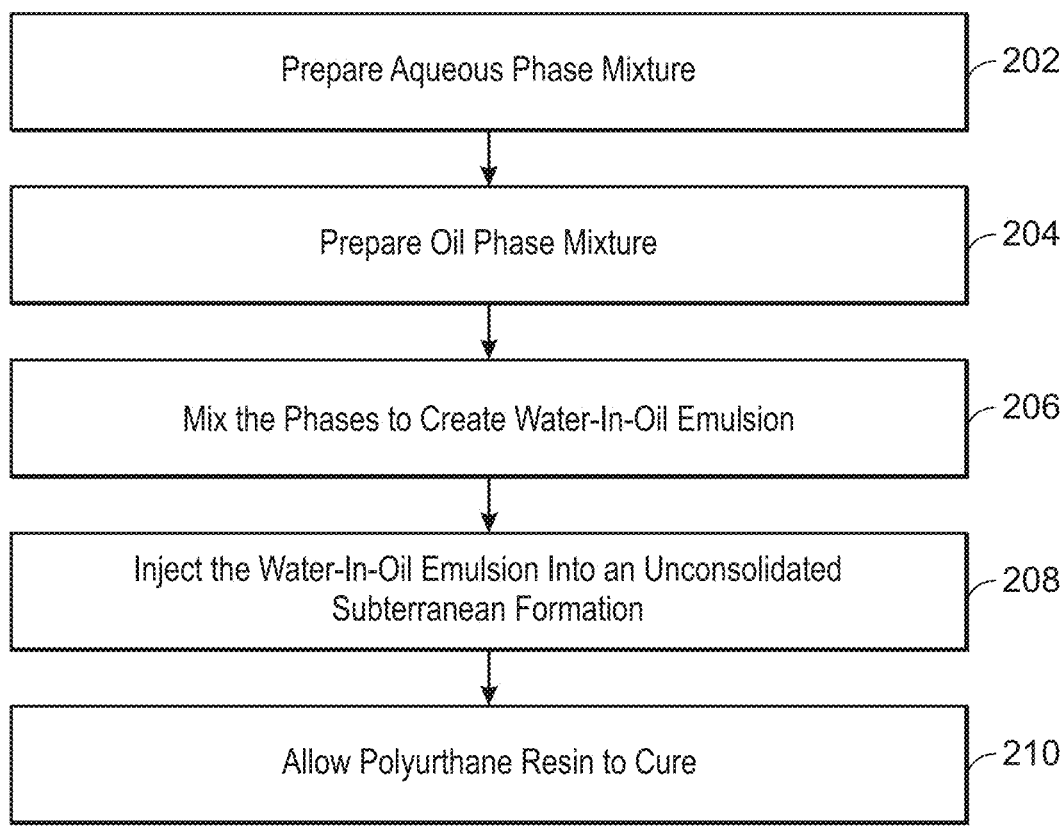
FIG. 2 is a process flow diagram of a method for consolidating a subterranean formation around a wellbore.

FIG. 2 is a process flow diagram of a method 200 for consolidating a subterranean formation around a wellbore. The method 200 begins at block 202 with the preparation of the aqueous phase. The aqueous phase comprises water and a polymerization catalyst.

Suitable catalysts useful to promote curing of polyurethane resin include organometallic compounds and tertiary amine compounds. In various embodiments, the catalyst includes dibutyltin dilaurate, stannous octoate, an organobismuth compound, triethylene diamine, bis(dimethylaminoethyl)ether, or dimethylethanolamine, among others. The catalyst is present in the aqueous solution in an amount of 0.005 to 4 percent of the total weight of the polyol and isocyanate compounds in the oil phase.

In some embodiments, the aqueous phase includes a salt. The salt lowers the tendency of the polyol and isocyanate monomers to dissolve in the aqueous phase. This may lower the amount of polymeric material forming in the aqueous phase during polymerization, increasing the porosity of the polyurethane material that is formed.

Suitable salts include mono-, di-, or trivalent inorganic salts such as chlorides, nitrates, and sulfates of alkali metals and alkaline earth metals. Examples include sodium chloride, potassium chloride, calcium chloride, sodium nitrate, potassium nitrate, calcium nitrate, sodium sulfate, potassium sulfate, and magnesium sulfate. In some embodiments, sodium chloride is added to the aqueous phase. Generally, the salt will be added to the water phase in a concentration range of about 0% to about 20% by weight of the water phase. In some embodiments, the salt forms about 1 to about 10% by weight of the water phase.

At block 204, the oil phase is prepared. In various embodiments, the oil phase includes a polyol compound, a polyisocyanate compound, and an oil soluble emulsifier or compatibilizer.

In some embodiments, the oil phase includes a solvent, while in other embodiments, the oil phase does not include a solvent. The use of a solvent may lower the concentration of the monomers in the oil phase, which may create a more open cell structure, increasing the permeability. Examples include tetrahydrofuran, dimethyl formamide, acetone, and dimethyl sulfoxide. In some embodiments, tetrahydrofuran is used as the solvent.

Suitable examples of a polyol compound include polymeric alcohols having a hydroxyl number in a range from about 14 to about 2,000 and an average functionality of 2 to 5. In various embodiments, the polyols include polyether polyols, polyester polyols, polycarbonate polyols, or polycaprolactone polyols, among others.

In various examples, the polyisocyanate compound includes an aliphatic isocyanate, a cycloaliphatic isocyanate, and an aromatic isocyanate, among others. In some embodiments, the polyisocyanate compound includes an aliphatic or a cycloaliphatic isocyanate. In various embodiments, the polyisocyanate is isophorone diisocyanate (IPDI), hexamethylene diisocyanate (HDI), or 4,4'-diisocyanato dicyclohexylmethane ($H_{12}$MDI), or any combinations thereof. In one embodiment, the polyisocyanate is isophorone diisocyanate. The equivalence ratio of isocyanate groups to the hydroxy groups from polyols is at least 1.2 or higher. In some embodiments, the equivalence ratio is higher than 1.5. As used herein, the equivalence ratio represents the molar ratio of the isocyanate groups in the polyisocyanate to the hydroxy groups in the polyol compounds.

In various embodiments, the emulsifiers or compatibilizers, used for stabilizing the water-in-oil emulsion, include sorbitan monooleate, sorbitan monomyristate, sorbitan monoesters, sorbitan monolaurate diglycerol monooleate (DGMO), polyglycerol monoisostearate (PGMIS), polyglycerol monomyristate (PGMM), diglycerol monooleate, diglycerol monomyristate, diglycerol monoisostearate, diglycerol monoesters, polyglycerol ricinoleate, and mixtures of these emulsifiers, among others. In various embodiments, the emulsifiers or compatibilizers also include diblock and triblock copolymers, such as styrene-butadiene, styrene-butadiene-styrene, styrene-isoprene, styrene-isoprene-styrene, methylmethacrylate-styrene, methylmethacrylate-butadiene, styrene-butadiene-methylmethacrylate, and ethylene oxide-propylene oxide, among others, and hydrogenated versions of the above. The emulsifier or compatibilizer is present in an amount of 2 to 30 percent by weight, based on the total weight of oil phase.

At block 206, the aqueous phase and oil phase are mixed to form a water-in-oil emulsion. The polyurethane treatment fluid described herein is a water-in-oil emulsion having at least 50 volume percent of an internal aqueous phase and less than 50 volume percent of an external oil (organic) phase.

At block 208, the water-in-oil emulsion is injected to the desired area containing unconsolidated or partially consolidated sand through the wellbore or a coiled tubing inside the wellbore. The injection process may be performed using a matrix treatment process.

At block 210, the resins are allowed to cure at downhole temperature to bond the sand grains. This forms a porous (open cell) polyurethane material.

EXAMPLES

Materials

The polyol tested was a polycaplolactone triol (PCL triol) was obtained from Daicel (U.S.A.), Inc. under the Placcel 309 product name. It had a molecular weight of about 900. The polyisoctanate was isophorone diisocyanate (IPDI), purchased from Sigma-Aldrich. The oil soluble emulsifier used was a block copolymer of ethylene oxide and propylene oxide, obtained from Croda under the Synperonic PE/L121 product name.

A tin-based catalyst, dibutyltin dilaurate (DBTDL), was purchased from Sigma-Aldrich. The salt used was sodium chloride, purchased from Sigma-Aldrich.

Typical Formulation Evaluation Procedure

To form the oil phase, the desired amounts of PCL triol, IPDI, and Synperonic PE L121, as shown in Table 1, were weighed into a plastic beaker. The compounds were then mixed under overhead agitation at 500 rpm for 2 min.

To form the aqueous phase, the desired amount of NaCl was dissolved in DI water, then DBDTL catalyst was added. The amounts used are shown in Table 1.

The aqueous phase was then added dropwise to the oil phase under agitation. After the addition was completed, the mixture was stirred for another 10 min at 500 rpm to form the water-in-oil (W/O) emulsion.

The W/O emulsion was transferred to a plastic beaker containing 100 mesh sand, and mixed into the sand under overhead agitation. The mixing was continued at 500 rpm for about 5 min, until all sand particles were well dispersed in the W/O emulsion.

The sand consolidation performance of the W/O emulsion was evaluated by transferring the sand/emulsion mixture to a test cell. Extra liquid was removed, then 1000 psi pressure was applied with nitrogen gas on top and 500 psi pressure with water at the bottom. The system was then cured for 20 hr. in an oven at 250° F.

Details of formulations used for Examples 1-3 are listed in Table 1. Each example was prepared and tested according to the procedure listed above.

TABLE 1

Curable Polyurethane Resin Formulations.

| | | Example 1 | Example 2 | Example 3 |
|---|---|---|---|---|
| Oil Phase (Component A) | IPDI (g) | 4 | 5 | 6 |
| | PCL Triol (g) | 6.2 | 6.5 | 5.5 |
| | Synperonic PE L121 (g) | 2 | 2 | 2 |
| | Total of Component A (g) | 12.2 | 13.5 | 13.5 |
| Aqueous Phase (Component B) | Water (g) | 36.15 | 36.15 | 36.15 |
| | NaCl (g) | 0.75 | 0.75 | 0.75 |
| | DBTDL (g) | 0.1 | 0.1 | 0.1 |
| | Total of component B (g) | 37 | 37 | 37 |
| Sand | 100 mesh sand (g) | 95 | 95 | 95 |

Figures 3A, 3B, 3C:
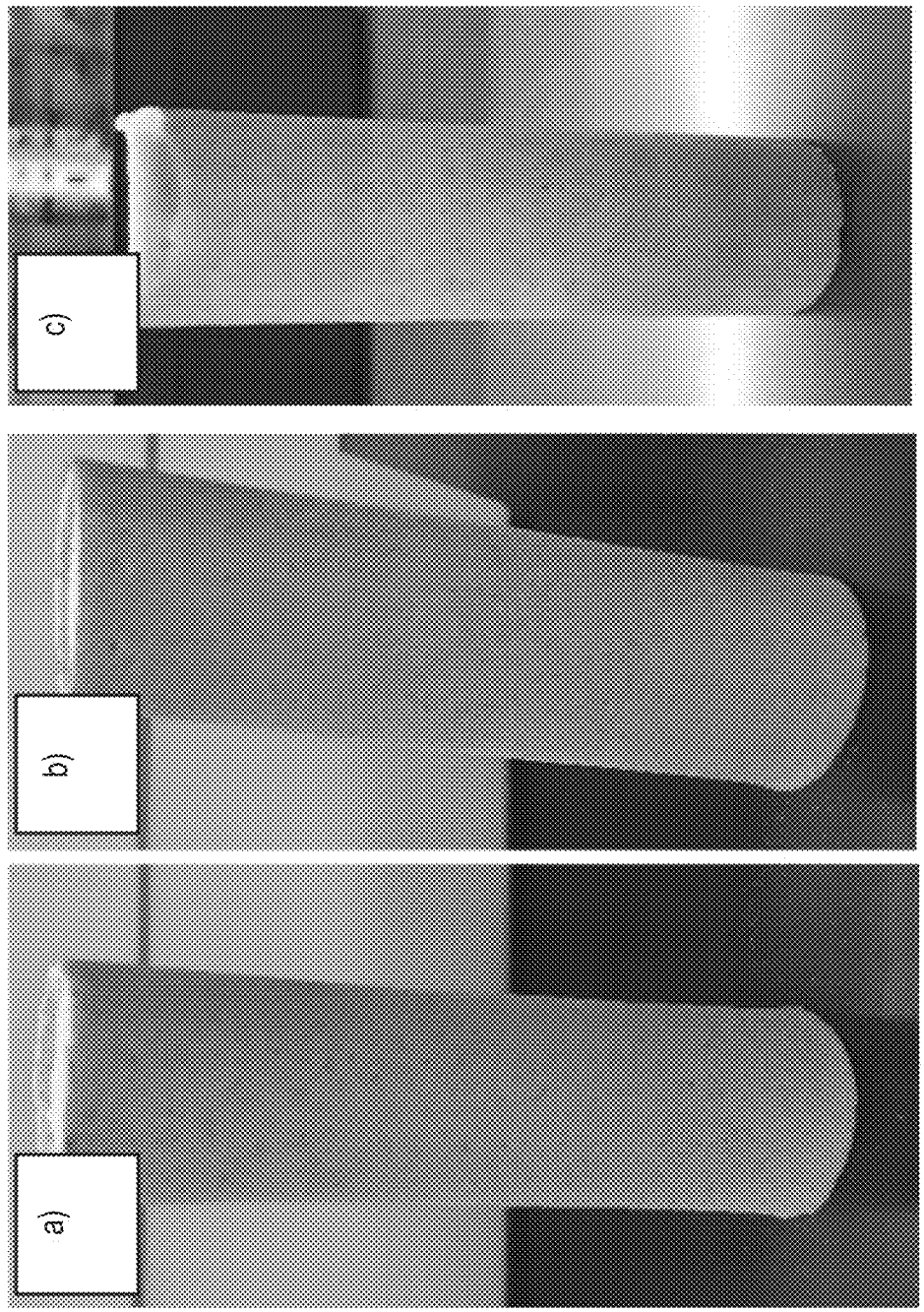
FIGS. 3A to 3C are images of consolidated sandpacks using the porous polyurethane described herein.

FIGS. 3A to 3C are images of consolidated sandpacks using the porous polyurethane described herein. FIG. 3A is the sandpack formed using the formulation of Example 1 in Table 1. FIGS. 3B and 3C are sandpacks formed from Examples 2 and 3, respectively.

As shown in the Figures, the loose sand particles became consolidated into cylindrical core plugs. Two evaluation experiments were conducted to evaluate the properties of the polyurethane consolidated sandpack (cores). The first experiment tests the unconfined compressive strength (UCS) of the consolidated sandpack formed in the test cell. The second experiment tests the permeability of the consolidated sandpack. Both experimental methods are commonly known and understood in the art.

A typical UCS test is performed by creating a cylindrical consolidated sandpack with a dimension of length to diameter ratio (L/D) of 2:1. The ends of the cylindrical are flat, parallel, and orthogonal to the axis of the cylinder. The core is placed in between two platens with no confinement around the circumference of the cylinder. Axial stress is applied through the platens to compress the core until catastrophic failure. The stress level at the failure is the UCS. The permeability test is a common core permeability testing known to one of ordinary skill of the art.

In the UCS tests, loose sand pack before being treated by a resin composition and method was at 0 psi. After treatment, the UCS of consolidated sandpack is measured using an Instron 5966 test frame with a 10 kilonewton (kN) loading cell. Cylindrical samples of 5 centimeters (cm) in length and 2.5 cm in diameter are cut from consolidated sandpack and used for the testing. The consolidated sandpack formed following formulation Example 1 could be easily compressed by over 40% without breaking. The stress causing around 45% strain is only about 150 psi. UCS for consolidated sandpacks formed from Example 2 and Example 3 are measured at 240 psi and 690 psi, with the strain at the failure determined to be 11.5% and 4%, respectively.

In the permeability tests, loose sand pack before being treated by a resin composition and method was in the range of 2 Darcy to 100 Darcy, depending on the particle size distribution and the packing process and density. After treatment, the consolidated core permeability measured from 0.010 Darcy to 10 Darcy. Permeability to 2% KCl aqueous solution through the consolidated sand pack is measured by a common core flooding equipment in which a confining pressure of 400 psi and a pore pressure of 200 psi is applied. The permeability of the consolidated samples at a flow rate of 15 milliliters per minute (mL/min) was determined to be 1100 millidarcy (mD), 409 mD, and 509 mD for Examples 1, 2, and 3, respectively.

EMBODIMENTS

An embodiment described in examples herein provides a method for consolidating a subterranean formation. The method includes injecting a water-in-oil emulsion into an unconsolidated subterranean formation, wherein the water-in-oil emulsion includes comonomers in an oil phase to form a polyurethane resin, and a catalyst in an aqueous phase. The method also includes allowing the polyurethane resin to cure to form a porous polymeric network.

In an aspect, the aqueous phase is formed by dispersing a catalyst in water. In an aspect, the catalyst includes an organometallic compound, a tertiary amine compound, or both. In an aspect, a salt is dissolved in the aqueous phase.

In an aspect, the oil phase is formed by mixing a polyol compound, a polyisocyanate compound, and an oil soluble emulsifier.

In an aspect, the method includes mixing the oil phase with the aqueous phase to form the water-in-oil emulsion. In an aspect, the oil phase includes less than 50% by volume of the water-in-oil emulsion.

In an aspect, injecting the water-in-oil emulsion into the unconsolidated subterranean formation includes extending a coil tubing line into a wellbore to reach the unconsolidated subterranean formation, and injecting the water-in-oil emulsion.

Another embodiment described in examples herein provides a composition for treating an unconsolidated subterranean formation, including a water-in-oil emulsion. The water-in-oil emulsion includes an oil phase including less than 50% by volume of the water-in-oil emulsion. The oil phase includes a polyol compound, a polyisocyanate compound, and an oil soluble emulsifier. The water-in-oil emulsion includes an aqueous phase including greater than 50% by volume of the water-in-oil emulsion. The aqueous phase includes water and a catalyst.

In an aspect, the polyol compound includes a polymeric alcohol having a hydroxyl number in a range from about 14 to about 2000, and a functionality of about 2 to about 5.

In an aspect, the polyol compound includes a polyether polyol, a polyester polyol, or a polycarbonate polyol, or any combinations thereof.

In an aspect, the polyol compound includes polycaprolactone triol.

In an aspect, the polyisocyanate compound includes an aliphatic isocyanate, a cycloaliphatic isocyanate, or an aromatic isocyanate, or any combinations thereof.

In an aspect, the polyisocyanate compound includes isophorone diisocyanate, hexamethylene diisocyanate, or 4,4'-diisocyanato dicyclohexylmethane, or any combinations thereof.

In an aspect, the polyisocyanate compound includes isophorone diisocyanate.

In an aspect, the oil soluble emulsifier includes sorbitan monooleate, sorbitan monomyristate, sorbitan monoesters, sorbitan monolaurate diglycerol monooleate (DGMO), polyglycerol monoisostearate (PGMIS), polyglycerol monomyristate (PGMM), diglycerol monooleate, diglycerol monomyristate, diglycerol monoisostearate, diglycerol monoesters, or polyglycerol ricinoleate, or any combinations thereof.

In an aspect, the oil soluble emulsifier includes styrene-butadiene block copolymers, styrene-butadiene-styrene block copolymers, styrene-isoprene block copolymers, styrene-isoprene-styrene block copolymers, methylmethacrylate-styrene block copolymers, methylmethacrylate-butadiene block copolymers, styrene-butadiene-methylmethacrylate block terpolymers, ethylene oxide-propylene oxide block copolymers, or hydrogenated versions of any of these polymers, or any combinations thereof.

In an aspect, the oil soluble emulsifier includes 2 to 30% by weight of the oil phase.

In an aspect, the oil soluble emulsifier includes a block copolymer of ethylene oxide and propylene oxide.

In an aspect, the oil phase includes a solvent. In an aspect, the solvent includes tetrahydrofuran.

In an aspect, the catalyst includes an organometallic compound, a tertiary amine compound, or both. In an aspect, the catalyst includes dibutyltin dilaurate, stannous octoate, an organobismuth compound, triethylene diamine, bis(dimethylaminoethyl)ether, or dimethylethanolamine, or any combinations thereof. In an aspect, the catalyst includes dibutyltin dilaurate.

In an aspect, the aqueous phase includes a salt. In an aspect, the salt includes sodium chloride. In an aspect, the salt includes 2% by weight of the aqueous phase.

Other implementations are also within the scope of the following claims.

What is claimed is:

1. A method for consolidating a subterranean formation, comprising:
    injecting a water-in-oil emulsion into an unconsolidated subterranean formation, wherein the water-in-oil emulsion comprises comonomers in an oil phase to form a polyurethane resin, and a catalyst in an aqueous phase, and wherein the catalyst is added to the aqueous phase before mixing the aqueous phase into the oil phase; and
    allowing the polyurethane resin to cure to form a porous polymeric network;
    wherein the subterranean formation after consolidation has a permeability of from 0.010 Darcy to 10 Darcy.

2. The method of claim 1, comprising forming the aqueous phase by dispersing the catalyst in water.

3. The method of claim 2, wherein the catalyst comprises an organometallic compound, a tertiary amine compound, or both.

4. The method of claim 2, comprising dissolving a salt in the aqueous phase.

5. The method of claim 1, comprising forming the oil phase by mixing a polyol compound, a polyisocyanate compound, and an oil soluble emulsifier.

6. The method of claim 1, comprising mixing the oil phase with the aqueous phase to form the water-in-oil emulsion.

7. The method of claim 6, wherein the oil phase comprises less than 50% by volume of the water-in-oil emulsion.

8. The method of claim 1, wherein injecting the water-in-oil emulsion into the unconsolidated subterranean formation comprises:
    extending a coil tubing line into a wellbore to reach the unconsolidated subterranean formation; and
    injecting the water-in-oil emulsion.

* * * * *